United States Patent [19]
Beckett et al.

[11] Patent Number: 5,663,802
[45] Date of Patent: Sep. 2, 1997

[54] METHOD AND APPARATUS FOR ENGRAVING USING MULTIPLE ENGRAVING HEADS

[75] Inventors: Tony D. Beckett, Dayton; Larry D. Holden, Bellbrook; David R. Seitz, Vandalia, all of Ohio

[73] Assignee: Ohio Electronic Engravers, Inc., Dayton, Ohio

[21] Appl. No.: 429,344

[22] Filed: Apr. 26, 1995

Related U.S. Application Data

[63] Continuation-in-part of Ser. No. 415,638, Apr. 3, 1995, which is a continuation-in-part of Ser. No. 242,012, May 12, 1994, Pat. No. 5,492,057, which is a continuation-in-part of Ser. No. 125,938, Sep. 23, 1993, Pat. No. 5,440,398, which is a continuation-in-part of Ser. No. 22,127, Feb. 25, 1993, Pat. No. 5,424,845.

[51] Int. Cl.$^6$ ............................................. B41C 1/02
[52] U.S. Cl. ............................................. 358/299
[58] Field of Search .................. 358/299; 356/378, 356/379; 364/474.35, 474.37; 107/32; 409/108

[56] References Cited

U.S. PATENT DOCUMENTS

| | | | |
|---|---|---|---|
| 3,280,252 | 10/1966 | Lilien et al. | 178/6 |
| 3,770,888 | 11/1973 | de Vos et al. | 178/6.6 B |
| 3,784,739 | 1/1974 | de Vos et al. | 178/6.6 B |

(List continued on next page.)

FOREIGN PATENT DOCUMENTS

| | | | |
|---|---|---|---|
| 0108162 | 9/1982 | European Pat. Off. | H04N 1/18 |
| 4435367 | 3/1995 | Germany . | |

OTHER PUBLICATIONS

"Datwyler," MDC Max Daetwyler Corp., USA, 13420 West Reese Blvd., Huntersville, NC 28078, undated brochure.

"Polishmaster Junior High–Precision Machining and Measuring Center for Rotogravure Cylinders," MDC Max Datwyler AG, Ch–3368 Bleienbach/Schweiz, Switzerland, undated brochure.

(List continued on next page.)

*Primary Examiner*—Eric Frahm
*Attorney, Agent, or Firm*—Jacox Meckstroth & Jenkins

[57] ABSTRACT

This system and method relates to an engraving system and method for engraving a pattern using a plurality of engraving devices. The engraving system discloses apparatus and method for sequencing and engraving of the plurality of engraving devices such that when the areas engraved by those heads meet to provide a continuous engraved pattern. The system and method utilizes an imaging system for imaging the engraved areas associated with each engraving head so that the heads or signals driving the heads may be adjusted to further facilitate providing engraved areas which appear as if they had been engraved by a single engraving head when, for example, the engraved area of one head meets the engraved area of another head. Also, disclosed is a method for sequencing and transmitting image data associated with an image to be engraved in order to accommodate any cylindrical offset or the angular displacement between, for example, two engraving heads that are positioned in a generally opposed relationship.

69 Claims, 9 Drawing Sheets

U.S. PATENT DOCUMENTS

| | | | |
|---|---|---|---|
| 4,007,362 | 2/1977 | Sindermann | 235/151 |
| 4,079,235 | 3/1978 | Froyd et al. | 364/107 |
| 4,126,821 | 11/1978 | Cannon | 318/696 |
| 4,342,052 | 7/1982 | Rackley et al. | 358/287 |
| 4,347,785 | 9/1982 | Chase et al. | 101/1 |
| 4,357,633 | 11/1982 | Buechler | 358/299 |
| 4,450,486 | 5/1984 | Buechler | 358/299 |
| 4,603,391 | 7/1986 | Inoue et al. | 364/474 |
| 4,678,976 | 7/1987 | Inoue | 318/577 |
| 4,683,500 | 7/1987 | Kitamura et al. | 358/280 |
| 5,329,215 | 7/1994 | Fraser et al. | 318/603 |
| 5,491,559 | 2/1996 | Buechler | 358/299 |
| 5,492,057 | 2/1996 | Bornhors, Jr. | 358/299 X |

OTHER PUBLICATIONS

"Polishmaster High–Precision Machining and Measuring Center for Gravure Cylinders," MDC Max Datwyler AG, CH–3368 Bleienbach/Schweiz Switzerland, undated brochure.

"Finishmaster Unit for Polishing of Rotogravure Cylinders After Copper or Chrome Plating," MDC Max Datwyler AG, Ch–3368 Bleienbach/Schweiz, Switzerland, undated brochure.

"Cu–Master Type E Plating Tanks for Copper–Plating of Rotogravure Cylinders," MDC Max Datwyler AG, CH–3368 Bleienbach/Schweiz, Switzerland, undated brochure.

"Cr–Master Type E Plating Tanks for the Chrome–Plating of Rotogravure Cylinders," MDC Max Datwyler AG, CH–3368 Bleienbach/Schweiz, Switzerland, undated brochure.

"Twin–Pilot," Maschinenfabrik Kaspar Walter GmbH & Co., KG, Plinganserstrasse 22, 8000 Munchen 70, Germany, undated brochure.

JAV, "Getting Better Accuracy with Non–Precision Ball Screws," American Machinist, Feb. 1993, pp. 50–51.

"HelioKlischograph K304—for Packaging and Product Gravure Printing," Hell Graphic Systems, Inc. Dr. Ing. Rudolf Hell GmbH, P.O. Box 6229, D–2300 Kiel 14, undated brochure.

"Helio–Klischograph—Precision Engraving in Copper," Hell Graphic Systems, Inc., Dr. Ing. Rudolf Hell GmbH, P.O. Box 6229, D–2300 Kiel 14, undated brochure.

"Helio Klischograph K301 and K302 for Magazine Gravure Printing," Hell Graphic Systems, Inc., Dr. Ing. Rudolf Hell GmbH, P.O. Box 6229, D–2300 Kiel 14, undated brochure.

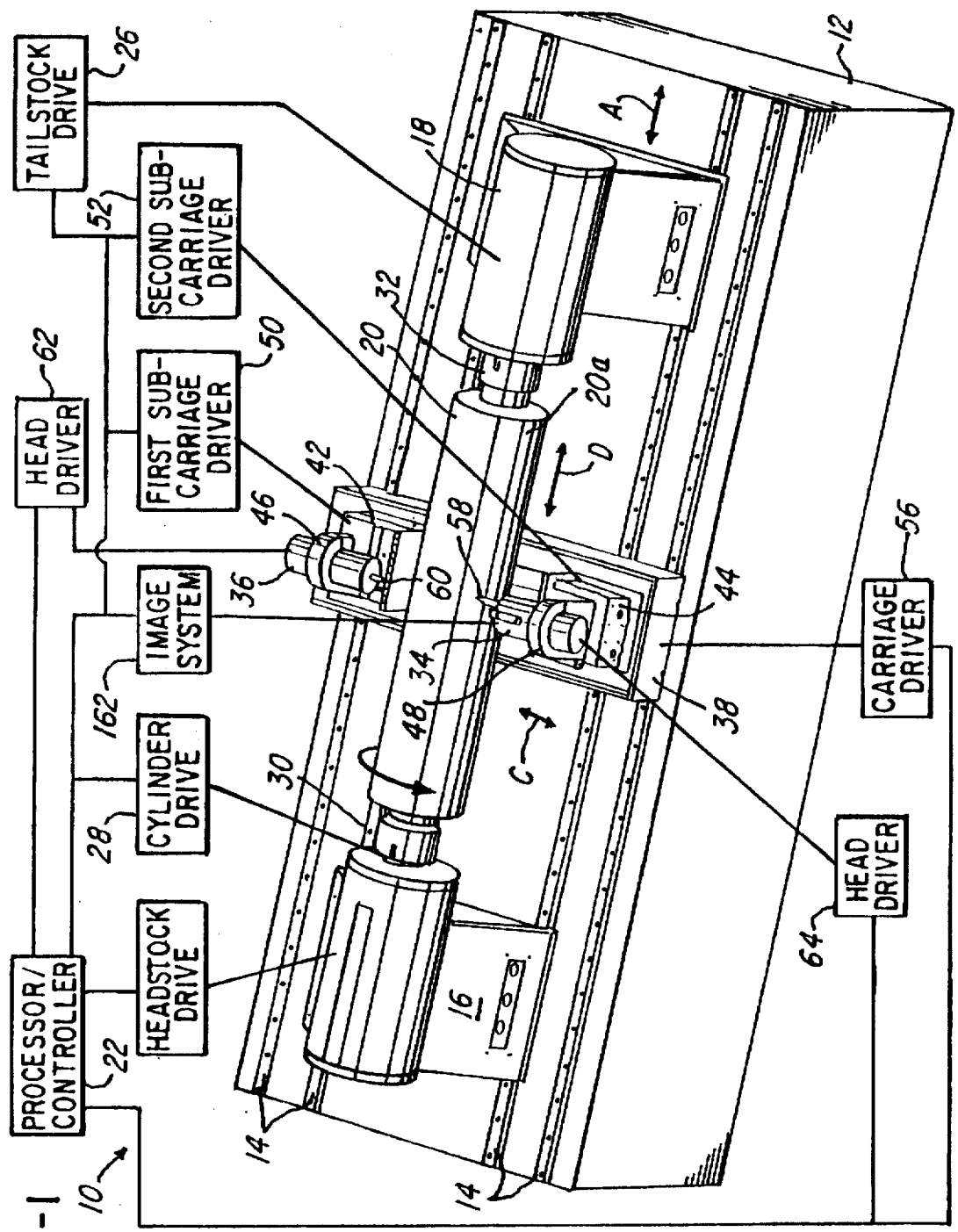

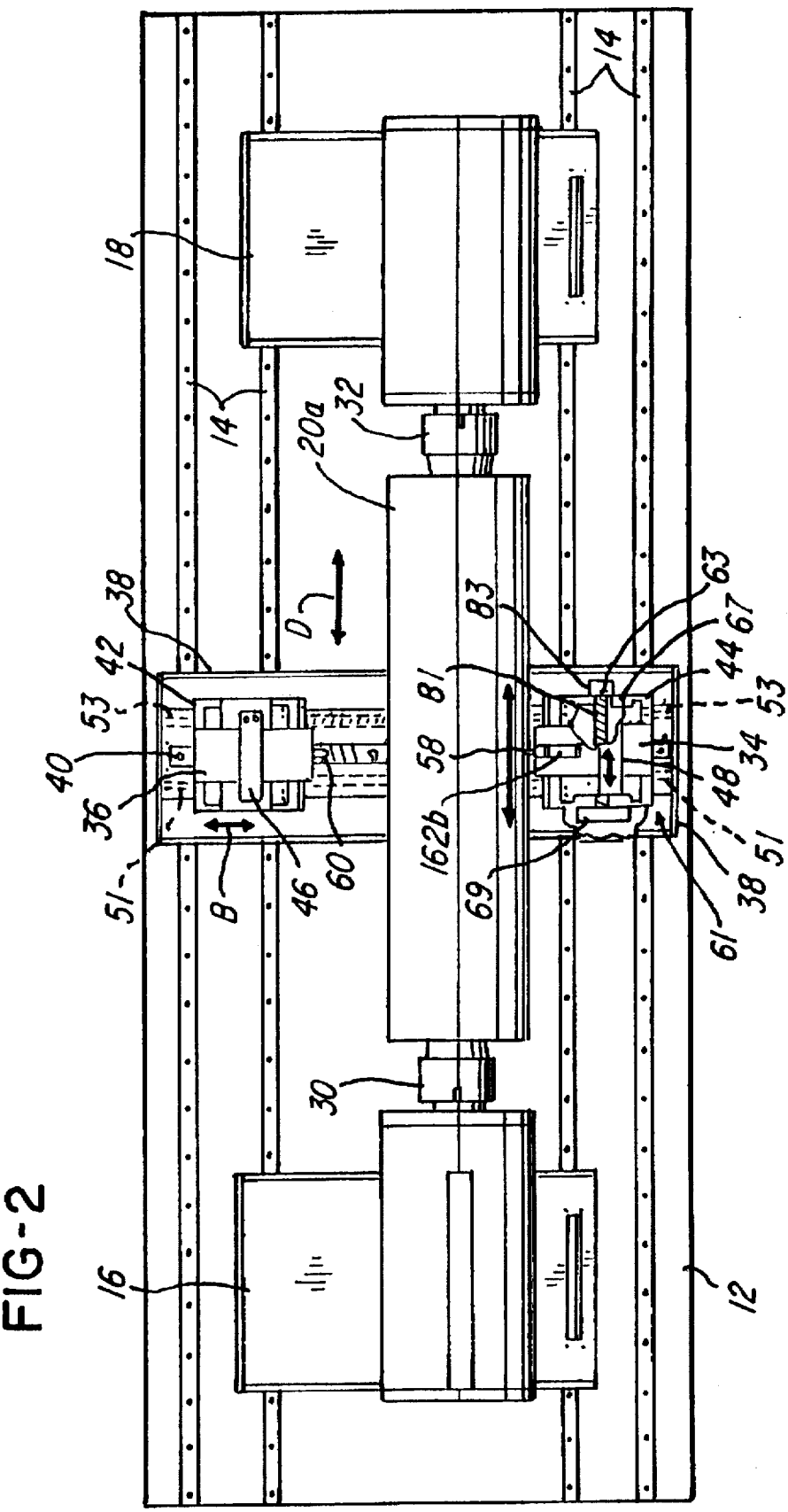

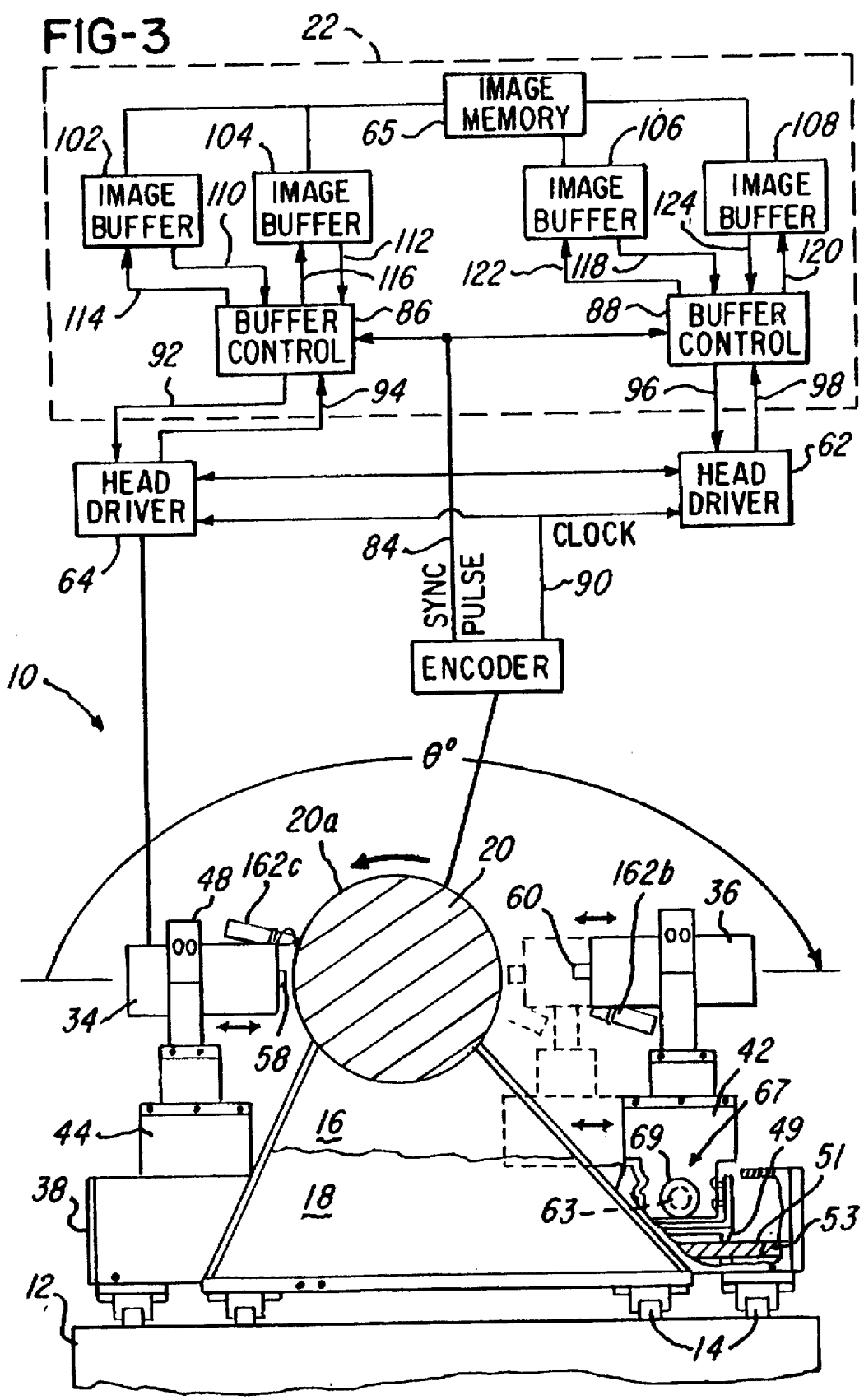

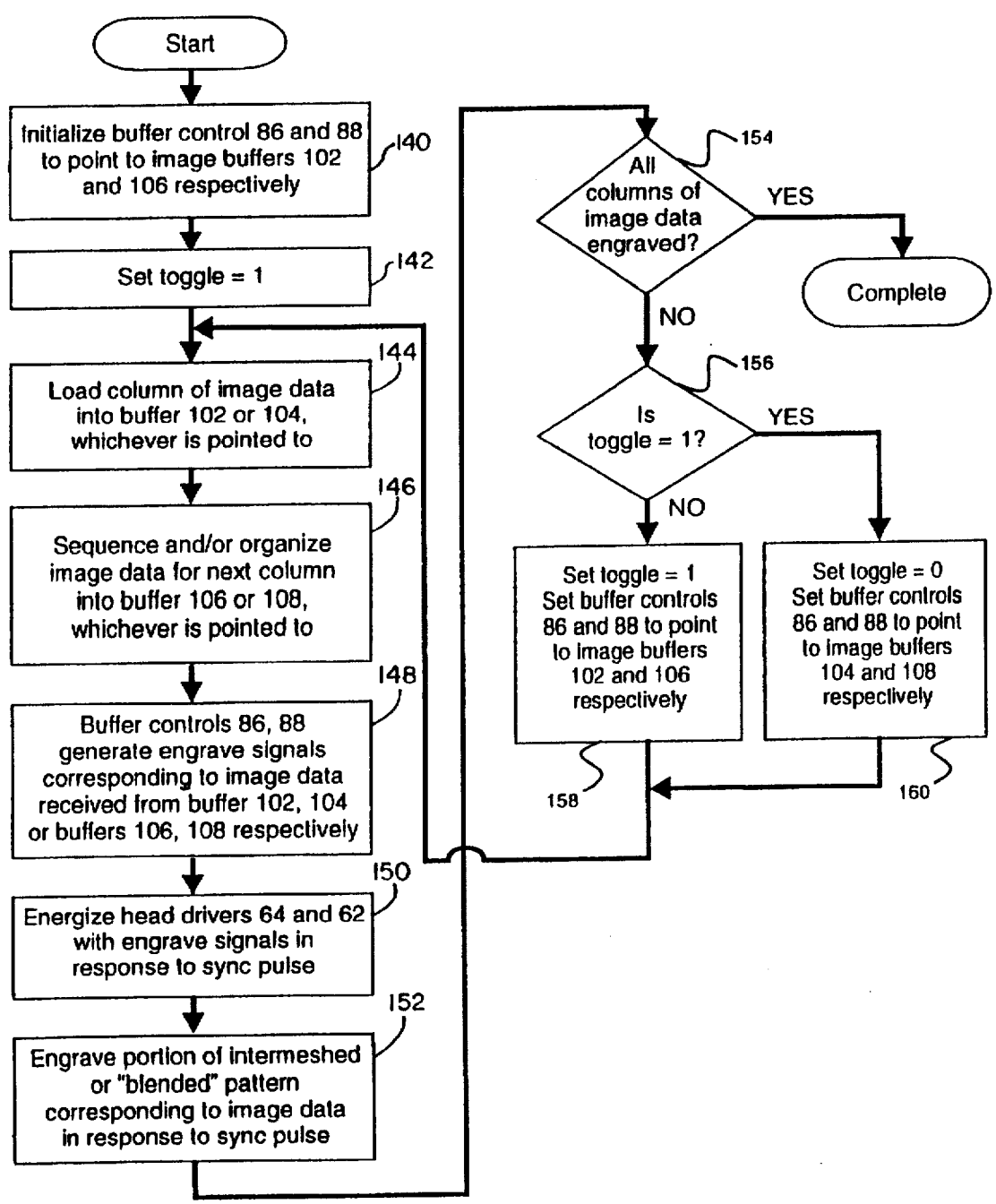

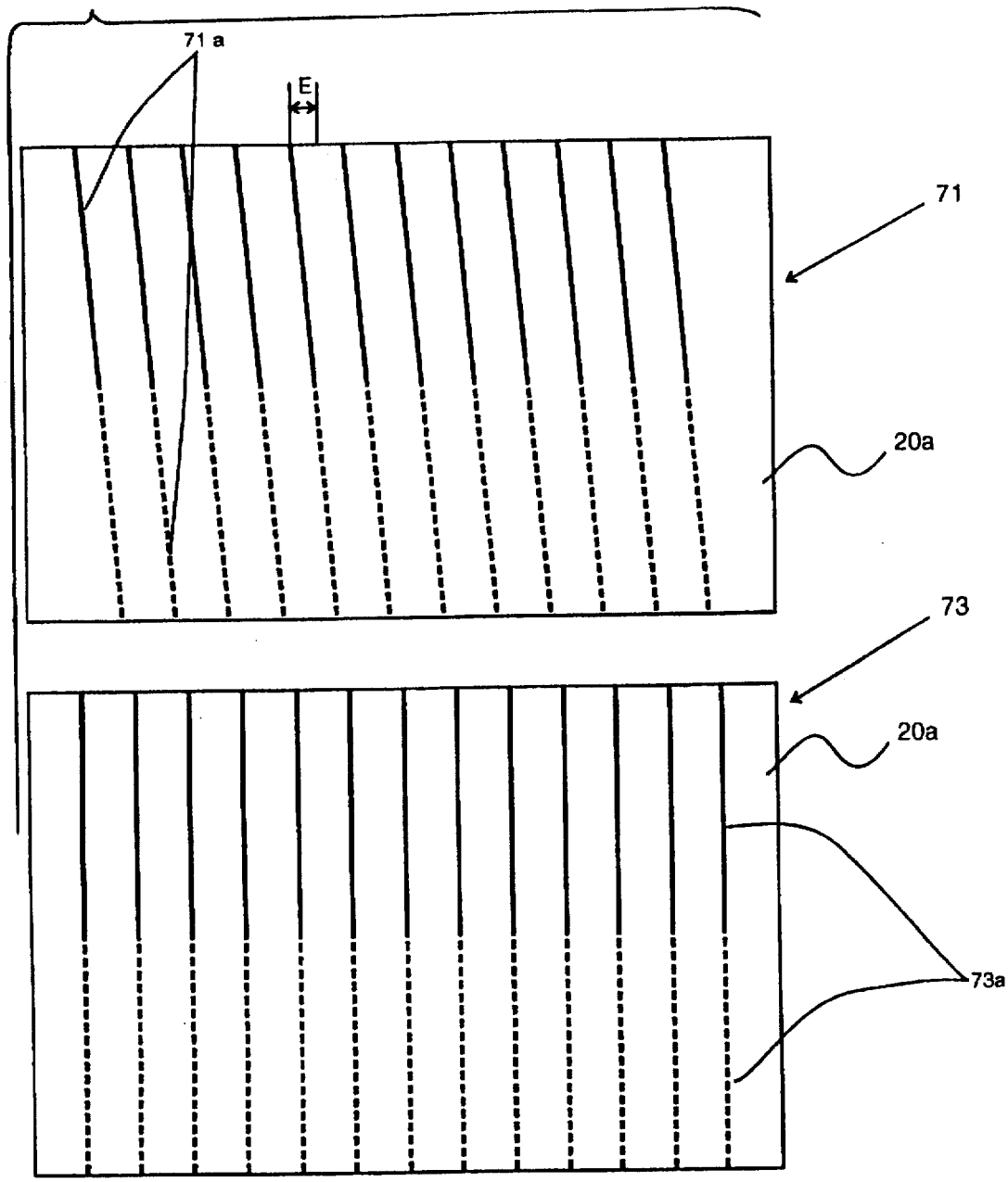

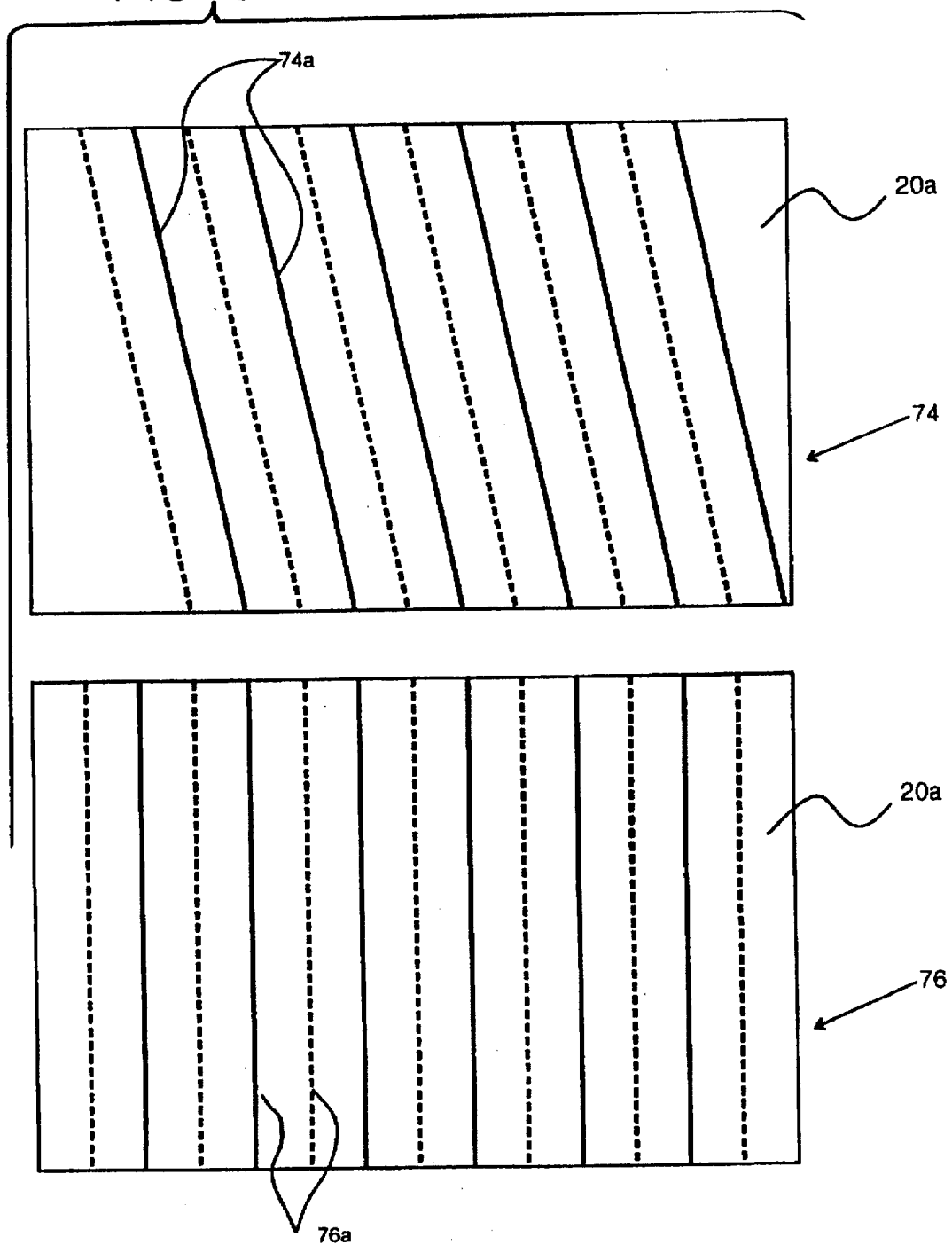

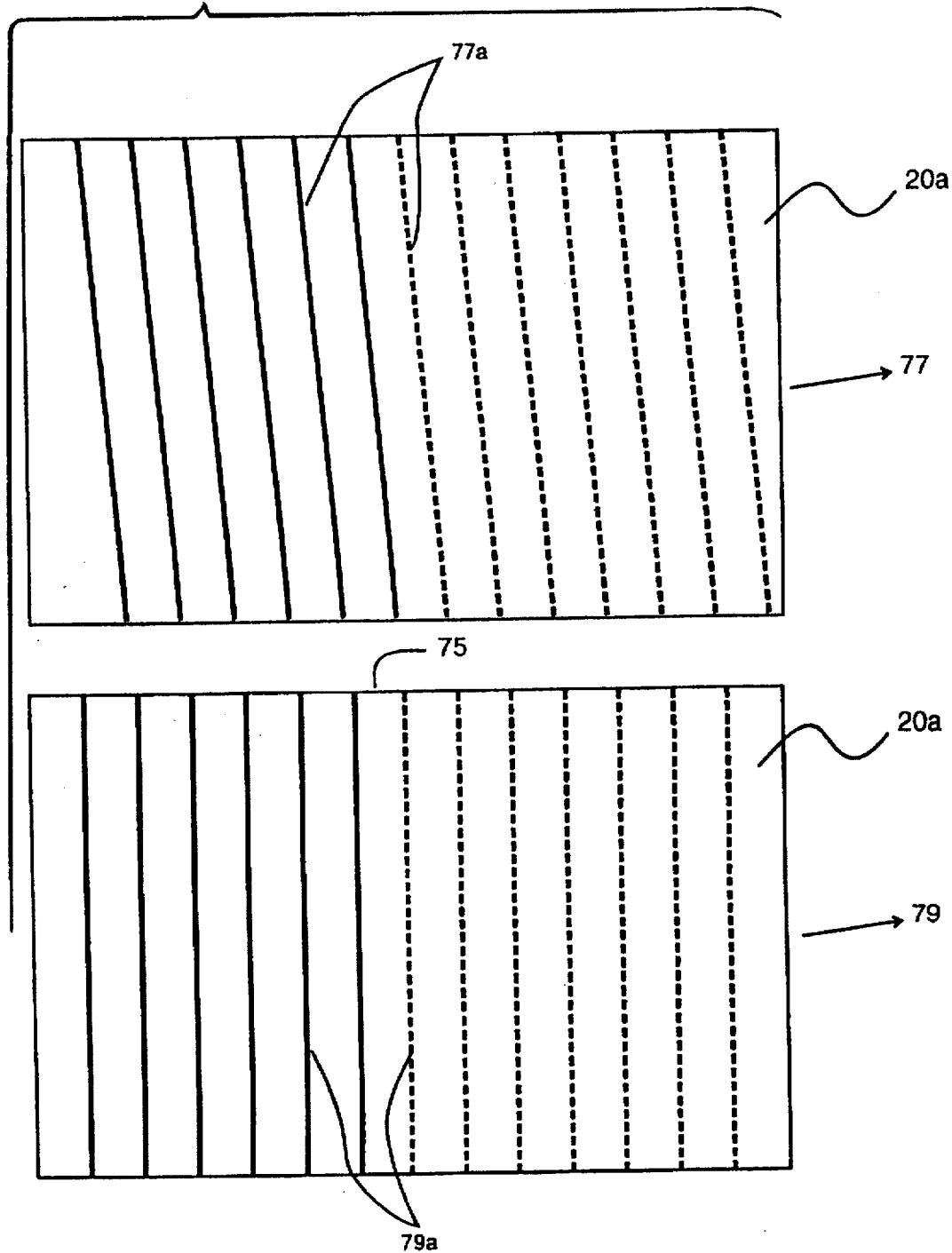

METHOD AND APPARATUS FOR ENGRAVING USING MULTIPLE ENGRAVING HEADS

CROSS-REFERENCE TO RELATED APPLICATIONS

This application is a continuation-in-part of U.S. Ser. No. 08/415,638 filed Apr. 3, 1995 which is a continuation-in-part of Ser. No. 08/242,012, filed May 12, 1994, now U.S. Pat. No. 5,492,057 issued Feb. 20, 1996, which is a continuation-in-part of U.S. Ser. No. 08/125,938, filed Sep. 12, 1993, now U.S. Pat. No. 5,440,398 issued Aug. 8, 1995; which is a continuation-in-part of U.S. Ser. No. 08/022,127, filed Feb. 25, 1993, now U.S. Pat. No. 5,424,845 issued Jun. 13, 1995.

BACKGROUND OF THE INVENTION

1. Field of the Invention

This invention relates to a system and method for engraving using multiple engraving heads, and more particularly, to an engraver having multiple engraving heads for engraving a substantially continuous, intermeshed or blended engraving pattern using multiple engraving heads.

2. Description of Related Art

The electromechanical engraving of a gravure cylinder involves rotating a cylinder while actuating an engraving head, or engraving heads having a diamond stylus carried on an oscillating shaft. The stylus cuts or engraves cells, lines of cells or tracks into the surface of the cylinder to produce an engraved cylinder for use in a printing process. The engraved cylinder is normally used in a web-type gravure printing press for printing paper, plastic, metallic film material, or other printed material.

In engravers for engraving cylinders used for printing publications, such as magazines or the like, the engraver may include multiple engraving heads wherein each engraving head includes a diamond stylus. By providing multiple heads, each head may be used to engrave different portions of the cylinder wherein each portion of the cylinder engraved by a respective head may, by way of example, correspond to a different page of the publication.

The movement of the styli for performing the engraving operation is precisely controlled to ensure that the engraved cells, or lines of cells or tracks formed by each engraving head are located at the desired positions on the cylinder. However, the initial positioning of the engraving heads relative to each has historically been very labor intensive wherein a skilled worker manually adjusts the position of each engraving head prior to an engraving operation.

Because of the manual intervention and because the styli of each engraver head wears differently, varying copper hardness in the surface of the cylinder, and differences in engraving response, characteristics of each engraving head and the like, it was difficult to use two or more engraving heads to engrave a continuous pattern. The cells or areas engraved by the different heads would not match-up, thereby creating an undesirable seam in the cylinder which may subsequently cause a visible printing defect.

Accordingly, there exists a need for a system and method for enabling multiple or a plurality of heads to be used in engraving operations such that the heads can cooperate to engrave a continuous blended and/or intermeshed pattern.

SUMMARY OF THE INVENTION

In one aspect of this invention, this invention comprises an engraving system consisting of a plurality of engraving devices and a processor coupled to said plurality of engraving devices for energizing each of said plurality of engraving devices to engrave an intermeshing pattern.

In another aspect, this invention comprises a method for engraving an intermesh pattern on a cylinder in an engraver consisting of the steps of situating a plurality of engraving devices in operative relationship to said cylinder and engraving said intermesh pattern.

In still another aspect, this invention comprises a method for engraving a cylinder using a plurality of engraving heads consisting of the steps of situating a plurality of engraving heads in operative relationship with said cylinder and simultaneously energizing the plurality of engraving heads to engrave a blended pattern on the cylinder.

In yet another aspect an engraver comprises an engraving bed comprising a headstock and a tailstock adjustably mounted thereon, the headstock and tailstock being capable of rotatably supporting a cylinder therebetween, a carriage slidably mounted on the engraving bed; a first engraving head slidably mounted on the carriage; a second engraving head slidably mounted on the carriage; the first and second engraving heads having a circumferential offset therebetween; and, a first and second engraving head driver for energizing each of the first and second engraving heads, respectively, to engrave at least one pattern on the cylinder wherein the at least one pattern comprises tracks of engraved areas which were engraved by the first and second engraving heads.

In still another aspect, a method of engraving a pattern comprised of a plurality of tracks of engraved areas, comprises the steps of engraving at least one of the plurality of tracks with a first head, and engraving another of the plurality of tracks with a second head.

Therefore, it is an object of the present invention to provide a system and method for engraving a blended or intermeshed pattern using a plurality of engraving heads.

It is a further object of the invention to provide a system and method for engraving a continuous pattern of engraved areas engraved from a plurality of engraving heads.

It is yet another object of the invention to provide a system and method for imaging engraved areas which were engraved by the plurality of engraving heads in order to facilitate blending or intermeshing the engraved areas to provide a continuous engraved pattern.

Other objects and advantages of the invention will be apparent from the following description, the accompanying drawings, and the appended claims.

BRIEF DESCRIPTION OF THE DRAWINGS

FIG. 1 is a general perspective view of an engraving system in accordance with one embodiment of the invention;

FIG. 2 is top view of the engraving system shown in FIG. 1;

FIG. 3 is a partially fragmented end view of the engraving system shown in FIG. 1 and also showing certain features of a processor used in the engraving system;

FIG. 5 is a general flowchart of a method for sequencing or organizing image data for use in the engraving system;

FIGS. 6A–6C show "laid-open" views of a cylinder showing various illustrative combinations of helically or cylindrically engraved tracks or lines of engraved areas engraved by the multiple engraving heads used in the engraving system with each track or line comprising, for example, a plurality of cells, channels and/or highlight cells.

DESCRIPTION OF PREFERRED EMBODIMENTS

Figure 4A:
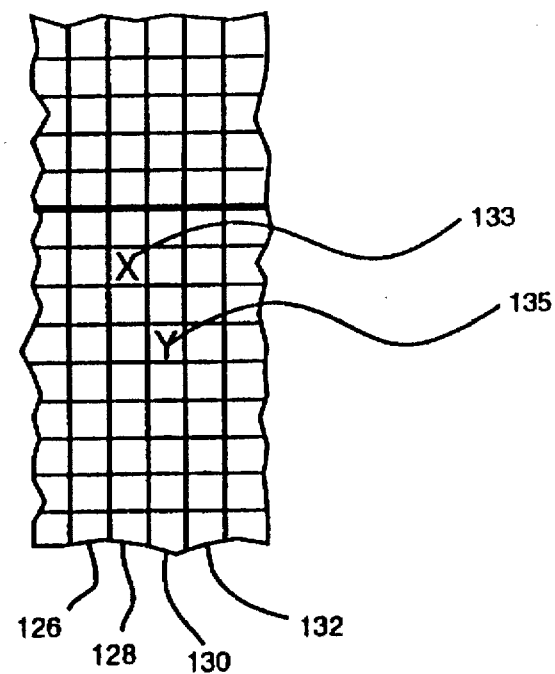
FIG. 4A is a fragmentary view of an image memory showing a plurality of storage locations for storing a plurality of columns of image data corresponding to at least a portion of an image to be engraved.

Referring now to FIG. 1, an engraving system or engraver 10 is shown having an engraving bed 12. The engraving bed 12 has a plurality of tracks or guide rails 14, upon which a headstock 16 and a tailstock 18 are slidably mounted so that they can move towards and away from each other (i.e., in the direction indicated by double arrow A in FIG. 1).

The headstock and tailstock 16 and 18 are capable of rotatably supporting a cylinder 20 using cone supports 30 and 32, respectively, for unshafted cylinders and using chucks (not shown) for cylinders having one or more shafts.

The engraver 10 also comprises a processor or controller 22 for controlling the operation of the engraver 10. The engraver 10 further comprises a headstock drive 24 and a tailstock drive 26 which are both coupled to controller 22 and which may be energized by controller 22 to cause the headstock 16 and tailstock 18, respectively, to move or be driven simultaneously or independently towards and away from each other. In this regard, the headstock and tailstock drives 24 and 26 may comprise various gears, pulleys and/or leadscrews (not shown) to facilitate driving the headstock 16 and tailstock 18. It should be appreciated also that this invention may be used in an environment where, for example, the headstock 16 is stationary. The drive system may include features taught and described in U.S. Pat. No. 5,329,215, which is assigned to the same assignee as the present invention, and which is hereby incorporated by reference and made a part hereof.

The controller 22 is also coupled to a cylinder drive 28 which may be associated with either or both headstock 16 and tailstock 18 for rotatably driving a cylinder 20 at an engraving station of engraver 10 in response to a cylinder drive signal received from controller 22.

The engraver 10 also comprises a multiple or plurality of engraving heads 34 and 36 which are slidably mounted on a carriage 38 which itself is slidably mounted on guide rails 14 on engraving bed 12 as shown. As best illustrated in the fragmentary top view of FIG. 2, notice that carriage 38 comprises a guide rail or track 40 upon which subcarriages 42 and 44 are slidably mounted such that they can move towards and away from each other in the direction of double arrows B and C, respectively. The engraving heads 34 and 36 may be mounted on subcarriages 42 and 44, respectively, with suitable brackets 46 and 48, as shown.

As best illustrated in FIG. 3, the engraving head 34 comprises an engraving device 58 and engraving head 36 comprises an engraving device 60 which are each capable of engraving engraved areas, including, for example, a series of cells 66, channels 68 and/or highlight cells 70 (FIG. 4B) as desired, into a surface 20a of cylinder 20. Notice that, in the embodiment being described, the engraving devices 58 and 60 are cylindrically offset or positioned on angle θ (FIG. 3) approximately 180° apart. It should be appreciated, however, that the engraving devices 58 and 60 could be positioned at any suitable cylindrical offset or angular distance relative to each other as desired to effect engraving. In this regard, the engraver 10 may comprise an adjuster or means for adjusting (not shown) the angular displacement or distance θ between engraving devices 58 and 60.

While FIG. 2 shows engraving devices 58 and 60 positioned such that they are substantially opposite each other, it should be noted that the carriage 38 could be modified such that the heads 36 and 34 are positioned adjacent to each other such that they engrave the cylinder 20 from the same side. In this event, the circumferential, angular displacement or offset would be zero or near zero.

It should also be appreciated that while the embodiment shown and described herein shows only two heads, it could comprise more heads or engraving devices as desired, in which case additional carriages, subcarriages, engraving head drivers and carriage drivers may be required.

In the embodiment being described, the engraving heads 34 and 36 and associated engraving devices 58 and 60 may comprise any suitable means for engraving surface 20a of cylinder 20. For example, a gravure engraving head and stylus of the type shown in U.S. Pat. Nos. 4,357,633; 4,438,460; 4,450,486; 4,451,886 and 4,500,929, which are incorporated herein by reference and made a part hereof, may be used. Alternatively, a magnetostrictive engraving head using a magnetostrictive member comprising a magnetostrictive actuator comprising $Tb_xDy_{1-x}Fe2$ of the type shown and described in U.S. Pat. No. 5,491,559, which is assigned to the same assignee as the present invention and which is incorporated herein by reference and made a part hereof, may be suitable. The method and system described herein may also be utilized with a laser engraving device (not shown) of the type used in laser engraving.

As illustrated in FIG. 1, the engraver 10 comprises a first head driver 62 and a second head driver 64 which are coupled to processor 22 and to engraving heads 34 and 36, respectively. The engraving head drivers 62 and 64 are capable of energizing engraving heads 34 and 36, respectively, in response to a drive signal received from controller 22.

The engraver 10 comprises a first subcarriage driver 50 (FIG. 1) and a second subcarriage driver 52 which are coupled to the first subcarriage 42 and second subcarriage 44, respectively, and which are also coupled to processor 22. Processor 22 is capable of selectively first and second subcarriage drivers 50 and 52 to step or drive subcarriages 42 and 44, respectively, and engraving heads 34 and 36 towards and away from each other as desired in order to position engraving heads 34 and 36 into and out of an operative relationship with cylinder 20.

The engraver 10 also comprises a carriage driver 56 which is coupled to the main carriage 38 and to processor 22 such that processor 22 can selectively energize carriage driver 56 to drive carriage 38 along guide rails 14 and in directions indicated by double arrow D (FIGS. 1 and 2) in order to effect engraving.

In the embodiment being described, the first and second carriage drivers 50 and 52 comprise a plurality of leadscrews 51 and 53 (FIGS. 2 and 3) which are rotatably mounted in suitable bearings (not shown) underneath carriage 38 and above tracks 14. The leadscrew 51, for example, cooperates with a threaded opening 49 (FIG. 3), in a wall 39 in sub-carriage 42, thereby driving the carriage 42 towards and away from cylinder 20 in response to the revolution of the leadscrew 51. Leadscrew 53 and sub-carriage 44 operate in a similar manner. The carriage drivers 50 and 52 also comprise stepper motors (not shown) coupled to processor 22 for selectively driving the leadscrews 51 and 53, thereby enabling sub-carriages 42 and 44 to be selectively driven towards and away from the cylinder 20.

In the embodiment being described, the engraver 10 also comprises a horizontal positioner 61 (FIG. 2) associated with sub-carriage 42 and coupled to processor 22 for adjustable positioning head 34 on sub-carriage 44, thereby enabling a horizontal or longitudinal relationship or distance between engraving device 58 and engraving device 60 to be adjusted. Although not shown, a similar positioner could be used relative to sub-carriage 42.

As illustrated in FIGS. 2 and 3, the positioner 61 comprises a leadscrew 63 which is rotatably mounted in threaded opening 81 in a housing 67 of sub-carriage 42. The positioner 61 comprises a stepper motor 69 coupled to processor 22 which rotatably drives leadscrew 63 in response thereto. Positioner 61 also comprises an encoder 83 coupled to processor 22 and associated with leadscrew for feeding information back to processor 22 regarding the position of sub-carriage 44 and engraving device 58 on carriage 38. As is described later herein, the positioner 61 provides means for adjusting, if necessary, the longitudinal (i.e., relative to cylinder 20) distance between engraving devices 58 and 60. This may be necessary when engraving tracks engraved by the different heads have to be offset.

It may be desired to incorporate carriage features illustrated in U.S. Pat. No. 5,492,057, which is assigned to the same assignee as the present invention and which is incorporated herein by reference and made a part hereof, although the advantages of the invention may be achieved without such features.

As illustrated in FIG. 3, engraver 10 further comprises an encoder 82 operatively associated with the cylinder drive 28 (FIG. 1) and which is capable of generating a synchronizing or sync pulse on line 84 (FIG. 3) which is received by head drivers 62 and 64, a first buffer control 86 and a second buffer control 88 which may be resident in processor 22. Encoder 82 also generates a clock pulse on line 90 which may be used to facilitate accessing image data corresponding to at least a portion of the intermeshed or blended pattern 72. The image data stored in sequential memory 65 in processor 22 and subsequently passed to head drivers 62 and 64 in a manner described later herein. The synchronizing pulse from encoder 82 causes the toggling of the first and second buffer controls 86 and 88 associated with head drivers 62 and 65, respectively. In this regard, buffer control 86 transmits image data along line 92 to head driver 64 and also receives clock pulses on line 94. Likewise, the second buffer control 88 transmits image data for engraving head 36 to engrave to head driver 62 via line 96 and receives clock pulses from head driver 62 on line 98.

Processor 22 may also comprise a plurality of image buffers such as buffers 102, 104, 106 and 108 (FIG. 3).

Figure 4B:
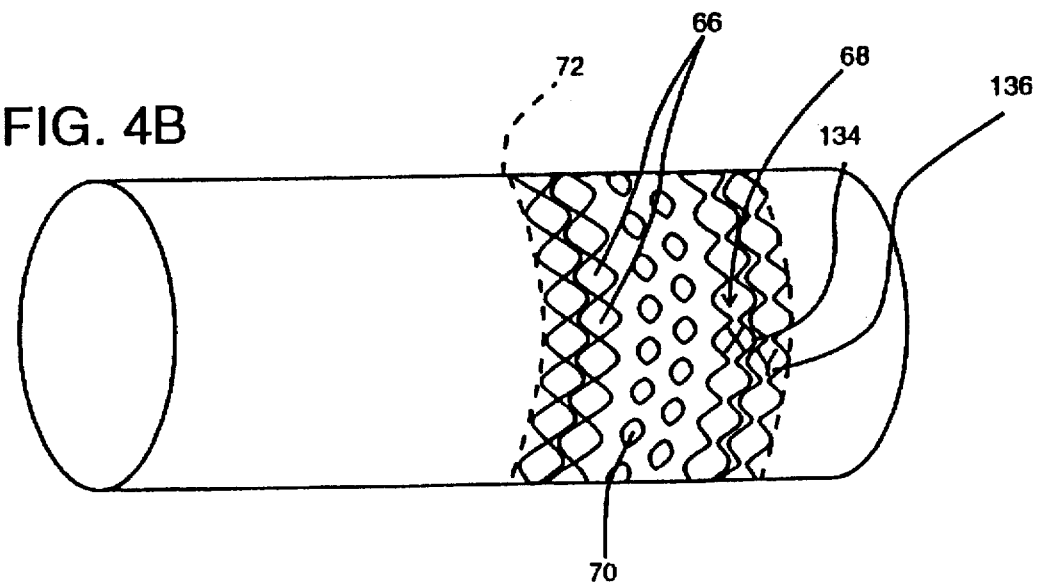
FIG. 4B is a view of an intermeshed or blended engraved pattern showing a plurality of cells corresponding to a portion of the image data in FIG. 4A.

Image buffers 102 and 104 transmit data along lines 110 and 112, respectively, in response to a clock pulse received on lines 114 and 116. In a similar manner, image buffers 106 and 108 transmit data along lines 118 and 120 to buffer control 88 in response to clock pulses received on lines 122 and 124, respectively. For purposes of illustrating the sequencing and synchronizing of image data associated with at least a portion of the blended pattern 72 to be engraved on cylinder 20, FIG. 4A is a fragmentary view which illustrates a portion of sequential memory having pixel density or imaged data associated with, for example, a pair of columns or density values for cells, such as 126 and 128 in FIG. 4B,
to be engraved on a surface 20a of cylinder 20. For example, image data values X and Y (FIGS. 4A and 4B), corresponding to densities value for areas of an image (not shown) to be engraved is stored in image memory locators 133 and 135.

Because of the angular or circumferential displacement between the heads 34 and 36, it may be necessary to organize or process the image data stored in image memory 65 and corresponding to blended pattern 72 to be engraved so that the image data is organized and sequenced such that the engraving performed by heads 34 and 36 becomes blended, joined, complementary and/or intermeshed as desired.

FIG. 4A illustrates a representation of a plurality of columns 126, 128, 130 and 132 of image data, corresponding to at least a portion of blended or intermeshed pattern as stored in memory (not shown) of processor 22'. In the embodiment being described, the image data corresponding to an image to be engraved is stored serially or sequentially by columns. It is important that when head drivers 62 and 64 energize engraving heads 36 and 34, respectively, in response to signals corresponding to the image data, the image data be buffered, organized and/or sequenced such that engraved areas, such as areas 134 and 136 (FIG. 4B) corresponding to data X and Y and memory locations 133 and 135 (FIG. 4A) are engraved in proper sequence and order. The sequence and order may also be affected by the cylindrical offset or angular displacement, as identified by θ in FIG. 3. In the embodiment being described, the angular displacement is about 180° as described earlier herein, and it could go up to 360°; however, it has been found that between 90° and 270° is preferable.

Accordingly, processor 22 comprises a double buffered memory arrangement for each head driver 62 and 64. In the embodiment being described, the double buffered memory generally operates on a first in, first out basis.

In this regard and as shown in FIG. 5, the buffer controls 86 and 88 are initialized to point to image buffers 102 and 106, respectively (block 140). At block 142 a toggle is set equal to 1. Thereafter, a column of image data, such as data column 126 in FIG. 4A is loaded into buffer 102 at block 144. In order to sequence and time the engraving performed by engraving head 36, the last one-half (180° divided by 360° ) of the next column of image data, such as column 128 in FIG. 4A followed by the first half of that column of image data is loaded into image buffer 106 (block 146). Buffer controls 86 and 88 generate (block 148) engraving signals corresponding to the image data received from buffers 102 and 106, respectively. Buffer controls 86 and 88 transmit engraved drive signals to head drivers 64 and 62, respectively, via lines 92 and 96 in response to the synchronizing pulse or sync pulse received on line 84 from encoder 82 (block 150). Head drivers 62 and 64 then energize engraving heads 36 and 34, respectively, to engrave at least a portion of the pattern corresponding to the image data (block 152).

If all columns of image data have been engraved at decision block 154, then the routine exits; otherwise it proceeds to process more columns of image data from memory 65. At decision block 156, it is determined whether the toggle is equal to one, which it will be the first time through the routine, in which case it proceeds to block 160 where the toggle is set to zero and the buffer controls 86 and 88 are energized to point to image buffers 104 and 108, respectively. If the decision at decision block 156 is negative, then the toggle is set to 1 and the buffer controls 86 and 88 are energized to point to image buffers 102 and 106, respectively (block 158). The routine proceeds back to block 144, as shown, so that further columns of image data from image memory 65 (FIG. 3) can be processed and engraved.

It is a feature of this invention to provide a system and method for engraving a surface 20a of cylinder 20 with a plurality of cells 66, channels 68 and/or highlight cells 70 using a plurality of engraving heads 34 and 36. It is a further feature of this invention to provide a plurality of engraving heads 34 and 36 for independently or simultaneously engraving the areas which make up a seamless intermeshing or blended pattern, such as pattern illustrated in FIGS. 6A–6C and FIG. 7.

In the embodiment being described relative to FIGS. 6A–6C, it should be appreciated that the solid-line tracks comprise areas engraved by engraving head 34, while the dashed-line tracks represent areas engraved by engraving head 36. For ease of illustration, each track was engraving during a full or partial revolution of cylinder 20.

In situations where there is a single engraving track (like helical pattern track 71 in FIG. 6A) or where there are multiple, cylindrical or "step-over tracks" 73a which make up a pattern like pattern 73 in FIG. 6A, it may be desirable to have engraving heads 34 and 36 substantially simultaneously engrave the cells 66, channels 68 and highlight cells 70 which make up the single helical engraving pattern 71. In this case, it is important, if not essential, to ensure that engraving heads 34 and 36 are properly synchronized and timed so that each of engraving tracks 71a appears continuous.

When engraving a pattern like the pattern 71 illustrated in FIG. 6A, for example, the heads 34 and 36 are caused to be positioned such that engraving devices 58 and 60 are displaced a distance E when engraving the helical track 71a. In contrast, for cylindrical or step-over engraving patterns (such as is illustrated in pattern 73 in FIG. 6A), the distance E is zero so that the devices 58 and 60 engrave along the same cylindrical track 73a.

After each individual track 71a of pattern 71 is engraved, processor 22 energizes carriage driver 56 to drive or step carriage 38 the distance E (for pattern 71 in FIG. 6A) or 2×E (for pattern 73 in FIG. 6A) so that heads 34 and 36 can engrave the next track.

FIG. 6B illustrates two other patterns 74 and 76 where multiple engraving tracks 74a and 76a which are adjacent and complementary to each other may be engraved by engraving heads 34 and 36, respectively. In this situation, it is desirable to align or set engraving devices 58 and 60 of engraving heads 34 and 36, respectively, a distance of 2 times E (2×E) such that the engravers 58 and 60 travel a distance of 4 times E (4×E) during engraving a complete revolution of cylinder 20.

For engraving a helical pattern where the tracks engraved by heads 34 and 36 are continuously adjacent (like pattern 74 in FIG. 6B), the carriage driver 56 would be energized by processor 22 to drive carriage 38 the distance of 4 times E (4×E) during the engraving and as the cylinder rotates a complete revolution. For the stepover or cylindrical pattern 76, the carriage driver 56 is energized by processor 22 to drive or step carriage 38 the distance of 4×E after engraving a complete track, such as track 76a. It should be appreciated relative to FIG. 6B, that as carriage 38 is incremented or driven the distance 4×E, each engraving head 34 and 36 is incremented or driven that same distance. As shown in FIG. 6B, it may be desirable to have, for example, engraver 58 engrave track 74a while engraver 60 engraves track 76a in order to engrave the blended or intermeshed pattern 72.

Figure 7:
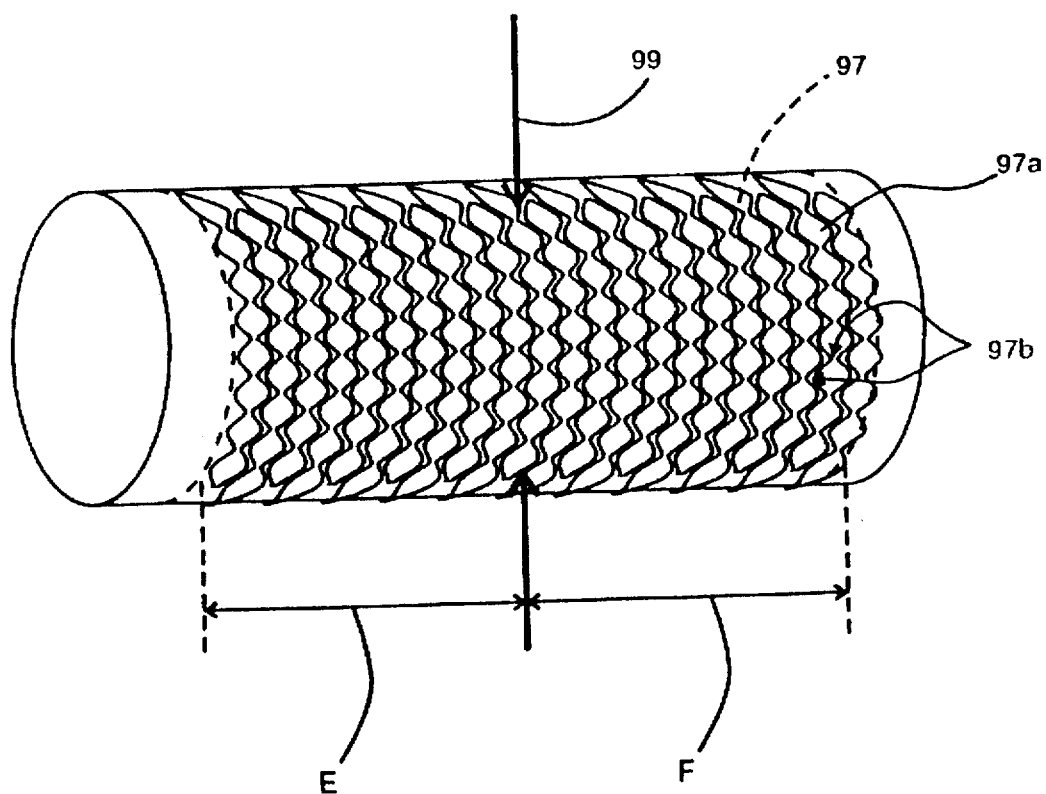
FIG. 7 is a further illustration similar to that in FIG. 6C showing a seam area formed by two engraved areas engraved by different engraving heads.

Regarding FIG. 6C, notice that a cylindrical pattern 79 is comprised of areas engraved by engraving heads 34 and 36, and this pattern is similar to an enlarged pattern 97 in FIG. 7 which comprises a plurality of cells 97a and channels 97b engraved by heads 34 and 36. Notice that where the areas engraved by the engraving heads 34 and 36 meet, a seam area, designated as 75 in FIG. 6C, is created. FIG. 6C illustrates a helical pattern 77 comprised of engraved areas engraved by engraving heads 34 and 36.

When engraving heads 34 and 36 are engraving areas or tracks which are not the same or which are not continually adjacent, but that meet to define a seam area, such as seam 75 in FIG. 6C or seam 99 in FIG. 7, then it is important that the seam 75 or seam 99 appear continuous so that no visible or undesirable discontinuity results. Thus, for example, if area E in FIG. 7 is engraved by head 34, while area F is engraved by head 36, then the area where their respective engraved areas meet and which defines seam 99 must "match-up" or be complementary otherwise an undesirable discontinuity may result.

A method of operating the engraving system will now be described.

The cylinder 20 is rotatably mounted between first and second cones 30 and 32 (FIG. 1). Image data corresponding to an image or portion of an image to be engraved is scanned or otherwise input into processor 22 and image memory 65 (FIG. 3). Processor 22 may then energize carriage driver 56 to position the engraving heads towards the leftmost end (as viewed in FIG. 1) of cylinder 20 Whereupon one or more test cuts may be performed in order to adjust or calibrate the engraving heads 34 and 36 and, for example, the position of engraving device 58 relative to engraving device 60. In this regard, processor 22 may energize motor 69 or positioner 61 to adjust the longitudinal position of sub-carriage 44.

After the heads 34 and 36 and engraving devices 58 and 60 have been calibrated, processor 22 may selectively energize first sub-carriage driver 50 and second sub-carriage driver 52 to position engraving heads 34 and 36, respectively, in operative relationship with surface 20a of cylinder 20 so that engraving may begin. It should be noted that processor 22 can selectively energize first and second sub-carriage drivers 50 and 52, as well as engraving heads 34 and 36 independently or simultaneously in order to effect the engraving described herein. Once the engraving heads 34 and 36 have been properly positioned relative to cylinder 20, engraving may begin.

Processor 22 may energize cylinder drive 28 to rotatably drive cylinder 20 and also energize carriage driver 56 to drive carriage 38 across the surface 20a of cylinder 20 so that engraving can be performed.

In this regard, processor 22 may begin processing image data stored in image memory 65 in accordance with the procedure described earlier herein relative to FIG. 5, thereby causing engraved areas comprising a plurality of cells 66, channels 68 and/or highlight cells 70 (FIG. 4B) or tracks of engraved areas to be engraved on surface 20a of cylinder 20, thereby defining an engraved pattern comprises of one or more of the patterns illustrated in FIGS. 6A–6C and FIG. 7, or some combination thereof.

Once the desired engraved image patterns have been engraved on cylinder 20, the processor 22 can again energize first and second sub-carriage drivers 50 and 52 to actuate carriages 42 and 44, respectively, to move away from each other. The cylinder 22 may then be removed from the engraver 10 and subsequently used in a printing press or operative.

It should be noted that when co-mingling or combining engraved areas such as engraved areas engraved by head 34 with areas engraved by head 36, it is important to have the engraved areas match up or be continuous where their respective engraved areas meet, as mentioned earlier herein. Because of engraving problems such as stylus wear, varying copper hardness along the surface 20a of cylinder, differences in engraving head characteristics and the like, it may be important to adjust the engraving performed by engraving heads 34 and 36 so that their respective engraved areas appear continuous where they meet. Such adjustments may include causing processor 22 to adjust the position of the sub-carriages 42 and 44 or the drive signals generated by head drivers 62 and 64 which are used to energize engraving heads 34 and 36, respectively.

Accordingly, engraver 10 may also comprise an image system or method 162 (FIG. 1), which is capable of imaging engraved areas during real time operation of the engraver. The image system 162 may comprises cameras 162a and 162b (FIG. 3) for optically imaging the surface 20a of cylinder 20. Characteristics of the engraved areas, such as width, depth, area, volume and the like, may then be determined and compared to desired characteristics. Processor 22 may use differences between actual and desired characteristics to adjust, for example, the drive signals used to energize engraving heads 36 and 34 and/or engraving devices 58 and 60 so that the areas engraved by the heads match or complement each other when they meet so that there is no undesirable seam or discontinuity in the pattern engraved on the cylinder 20.

The features embodied in the image systems shown and described in U.S. Pat Nos. 5,424,845; 5,440,398; and U.S. patent application Ser. No. 08/415,638 which are assigned to the same assignee as the present invention and which are incorporated herein by reference and made a part hereof may be used in this invention.

Advantageously, this method and apparatus facilitates utilizing multiple engraving heads to effect engraving an image comprised of engrave areas from multiple engraving heads where the engraved areas are intermeshed, blended, co-mingled, joined or otherwise combined to provide an engraved area.

While this apparatus has been shown and described having a pair of engraving heads 34 and 36 it should be appreciated that multiple carriages and sub-carriages having multiple engraving heads may be slidably mounted on engraving bed 12 to further facilitate engraving a blended, joined and/or intermeshed pattern. This invention is not limited to engraving symmetrical patterns of the type shown in FIGS. 6A–6C and 7, but could be used to engrave any of areas engraved plurality of areas engraved by two or more engraving devices. Also, it should be appreciated that this invention facilitates over engraving or overlapping cells engraved by one head with those of another head.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An engraving system for engraving a workpiece, comprising:
   a plurality of engraving devices; and
   a controller coupled to said plurality of engraving devices for independently energizing each of said plurality of engraving devices to independently drive said plurality of engraving devices to engrave an intermeshing pattern on the workpiece.

2. The engraving system as recited in claim 1 wherein said system further comprises:
   an engraving bed;
   said plurality of engraving devices being situated on said engraving bed.

3. The engraving system as recited in claim 1 wherein said plurality of engraving devices comprises a plurality of engraving heads.

4. The engraving system as recited in claim 1 wherein each of said plurality of engraving devices are angularly displaced relative to one another.

5. The engraving system as recited in claim 4 wherein said plurality of engraving heads are angularly displaced at least 90 degrees apart.

6. The engraving system as recited in claim 4 wherein said plurality of engraving heads are angularly displaced about 180 degrees apart.

7. The engraving system as recited in claim 1 wherein said intermeshing pattern comprises a line of a plurality of engraved cells, said plurality of engraved cells being engraved by at least two of said plurality of engraving devices.

8. The engraving system as recited in claim 1 wherein said plurality of engraving devices comprises at least a first plurality of engraving device and a second engraving device, said intermeshing pattern comprising a first line of engraved cells engraved by said first engraving device and a second line of engraved cells engraved by said second engraving device.

9. The engraving system as recited in claim 8 wherein said first and second lines of engraved cells are adjacent to each other.

10. The engraving system as recited in claim 9 wherein said first and second lines of cells are continuously adjacent.

11. The engraving system as recited in claim 1 wherein said system comprises:
   a plurality of engraving device drivers for driving said plurality of engraving devices.

12. The engraving system as recited in claim 1 wherein said workpiece is a cylinder.

13. An engraving system for engraving a workpiece, comprising:
   a plurality of engraving devices; and
   a controller coupled to said plurality of engraving devices for energizing each of said plurality of engraving devices to engrave an intermeshing pattern on the workpiece;
   an image memory for storing image data associated with an image to be engraved on a workpiece;
   a plurality of engraving device drivers for driving said plurality of engraving devices;
   said controller further comprising:
      at least one buffer controller coupled to said plurality of engraving device drivers, respectively, and
      a controller coupled to said plurality of buffer controllers for selectively energizing said at least one buffer controller to sequence image data transmitted from said image memory.

14. The engraving system as recited in claim 13 wherein said controller comprises an encoder associated with a workpiece drive motor in said engraving system.

15. An engraving system for engraving a workpiece, comprising:
   a plurality of engraving devices;

a controller coupled to said plurality of engraving devices for energizing each of said plurality of engraving devices to engrave an intermeshing pattern on the workpiece; and wherein said engraving device comprises:

a magnetostrictive member coupled to a stylus.

16. The engraving system as recited in claim 15 wherein the magnetorestrictive member comprises $Tb_xDy_{1-x}Fe2$.

17. An engraving system for engraving a workpiece, comprising:

a plurality of engraving devices;

a controller coupled to said plurality of engraving devices for energizing each of said plurality of engraving devices to engrave an intermeshing pattern on the workpiece; and wherein said system further comprises:

a positioner for adjusting the position of at least one of said plurality of engraving devices relative to another of said plurality of engraving devices.

18. A method for engraving an intermesh pattern on a workpiece in an engraver comprising the steps of:

situating a plurality of engraving devices in operative relationship to said workpiece;

independently energizing and driving said plurality of engraving devices; and engraving said intermesh pattern.

19. The method as recited in claim 18, further comprising:

situating said plurality of engraving devices an angular distance apart.

20. The method as recited in claim 19, further comprising the step of:

transmitting image data from a memory storage to accommodate said angular distance.

21. The method as recited in claim 18, further comprising:

situating said plurality of engraving devices an angular distance apart of at least 90 degrees.

22. The method as recited in claim 18, further comprising:

situating said plurality of engraving devices an angular distance apart of about 180 degrees.

23. The method as recited in claim 18 wherein said intermesh pattern comprises a plurality of lines of cells, further comprising the step of:

engraving said plurality of lines with said plurality of engraving devices, respectively.

24. The method as recited in claim 18 wherein said intermesh pattern comprises at least two lines of cells and said plurality of engraving devices comprises at least two engraving heads, said method further comprising the step of:

engraving said at least two lines of cells with said at least two engraving heads.

25. The method as recited in claim 18 wherein said intermesh pattern comprises at least one line of cells, said method further comprising:

engraving said at least one line of cells with said plurality of engraving devices.

26. The method as recited in claim 25 wherein said at least one line of cells comprises a single helical line of cells.

27. The method as recited in claim 24 wherein said at least one line of cells comprises a circumferential line of cells.

28. The method as recited in claim 18, further comprising the step of:

simultaneously energizing said plurality of engraving devices to simultaneously engrave said intermesh pattern.

29. The method as recited in claim 18, further comprising:

generating a plurality of drive signals corresponding to at least a portion of said intermesh pattern;

energizing each of said plurality of engraving devices with at least one of said plurality of drive signals.

30. The method as recited in claim 18, further comprising:

causing one of said plurality of engraving devices to engrave said first portion of said intermesh pattern;

causing another of said plurality of engraving devices to engrave said second portion of said intermesh area.

31. The method as recited in claim 18, further comprising:

causing one of said plurality of engraving heads to overengrave an engraved area engraved by another of said plurality of engraving heads.

32. The method as recited in claim 18, further comprising:

adjusting a horizontal position of one of said plurality of engraving devices relative to another of said plurality of engraving devices.

33. A method for engraving a workpiece using a plurality of engraving heads comprising the steps of:

situating a plurality of engraving heads in operative relationship with said workpiece; and simultaneously energizing said plurality of engraving heads while independently driving each of said plurality of engraving heads to engrave a blended pattern on the workpiece.

34. The method as recited in claim 33 wherein said blended pattern comprises a plurality of engraving tracks, said method further comprising the step of:

energizing each of said plurality of engraving heads to engrave at least one of said plurality of engraving tracks.

35. The method as recited in claim 33 wherein said plurality of engraving heads comprises a first head and a second head, said blended pattern comprises at least a first track and a second track, said method further comprising:

engraving said first track with said first head and a second track with said second head.

36. The method as recited in claim 35 wherein said first and second tracks are generally adjacent to each other.

37. The method as recited in claim 33, further comprising:

situating one of said plurality of heads a predetermined distance from another of said plurality of heads.

38. The method as recited in claim 37 wherein said predetermined distance is an angular distance of at least 90 degrees.

39. The method as recited in claim 37 wherein said predetermined distance is an angular distance on the order of about 180 degrees.

40. The method as recited in claim 33, further comprising:

storing image data corresponding to said blended pattern into at least one buffers;

organizing said image data in said at least one buffer;

generating image signals for energizing said plurality of engraving heads in response to said image data in said at least one buffer.

41. The method as recited in claim 40 wherein said plurality of engraving heads comprises a first head and a second head, said method further comprising:

transmitting said image data in response to an angular distance between said first and second heads.

42. The method as recited in claim 41 wherein said angular distance is between 90–270 degrees.

43. A method for engraving a workpiece using a plurality of engraving heads comprising the steps of:

situating a plurality of engraving heads in operative relationship with said workpiece; and simultaneously energizing said plurality of engraving heads to engrave a blended pattern on the workpiece; and wherein said method further comprises the steps of:
generating a plurality of image signals corresponding to at least a portion of said blended pattern;
energizing said plurality of engraving heads with said plurality of image signals.

44. A method for engraving a workpiece using a plurality of engraving heads comprising the steps of:
situating a plurality of engraving heads in operative relationship with said workpiece;
simultaneously energizing said plurality of engraving heads to engrave a blended pattern on the workpiece; and wherein said method further comprises the steps of:
energizing said plurality of engraving heads to simultaneously engrave in substantially the same engraving track.

45. The method as recited in claim 35 wherein said engraving track is generally helical.

46. The method as recited in claim 35 wherein said engraving track is generally cylindrical.

47. A method for engraving a workpiece using a plurality of engraving heads comprising the steps of:
situating a plurality of engraving heads in operative relationship with said workpiece;
simultaneously energizing said plurality of engraving heads to engrave a blended pattern on the workpiece; and wherein said plurality of heads comprises a first head and a second head, said method further comprises the step of:
transmitting said image data corresponding to said blended pattern to account for a circumferential offset between said first head and said second head.

48. The method as recited in claim 47 wherein said circumferential offset is about zero.

49. The method as recited in claim 47 wherein said circumferential offset is between 90 and 270 degrees.

50. The method as recited in claim 47 wherein said circumferential offset is about 180 degrees.

51. A method of engraving a pattern comprised of a plurality of tracks of engraved areas, comprising the steps of:
engraving at least one of said plurality of tracks with a first head; and
engraving another of said plurality of tracks with a second head which is driven independently of said first head.

52. The method as recited in claim 51, further comprising the step of:
offsetting said first head from said second head by an angular offset.

53. The method as recited in claim 52 wherein said angular offset is between 90 and 270 degrees.

54. The method as recited in claim 51, further comprising the steps of:
imaging at least a portion of said plurality tracks and generating image data corresponding thereto;
evaluating said image data to determine if said at least one of said plurality of engraving tracks engraved by said first head complements said another of said plurality of engraving tracks engraved by said second head.

55. The method as recited in claim 51 wherein said at least one of said plurality of engraving tracks is situated adjacent to said another of said plurality of engraving tracks.

56. The method as recited in claim 51 wherein said at least one of said plurality of engraving tracks is serially located relative to said another of said plurality of engraving tracks.

57. The method as recited in claim 51 further comprising the steps of:
transmitting image data in response to a cylindrical offset between said first and second engraving heads;
generating a first head drive signal corresponding to said at least one of said plurality of tracks and a second head drive signal corresponding to said another of said plurality of tracks in response to said image data.

58. A method of engraving a pattern comprised of a plurality of tracks of engraved areas, comprising the steps of:
engraving at least one of said plurality of tracks with a first head;
engraving another of said plurality of tracks with a second head; and further comprising the steps of:
determining a cylindrical offset between said first head and said second head;
energizing said first and second engraving heads with drive signals in consideration of said cylindrical offset.

59. An engraver comprising:
an engraving bed comprising a headstock and a tailstock mounted thereon; said headstock and tailstock being capable of rotatably supporting a cylinder therebetween;
a carriage slidably mounted on said engraving bed;
a first engraving head mounted on said carriage;
a second engraving head mounted on said carriage, said first and second engraving heads having a circumferential offset therebetween;
a controller coupled to said first and second engraving heads for independently energizing each of said first and second engraving heads to engrave at least one pattern on said cylinder wherein said at least one pattern comprises tracks of engraved areas which were engraved by said first and second engraving heads.

60. The engraver as recited in claim 59 wherein said intermeshing pattern comprises a line of a plurality of engraved cells, said plurality of engraved cells being engraved by at least two of said plurality of engraving devices.

61. The engraver as recited in claim 59 wherein said plurality of engraving devices comprises at least a first engraving device and a second engraving device, said intermeshing pattern comprising a first line of engraved cells engraved by said first engraving device and a second line of engraved cells engraved by said second engraving device.

62. The engraver as recited in claim 59 wherein said circumferential offset is between 90–270 degrees.

63. The engraver as recited in claim 59, wherein said controller comprises a generator for generating a plurality of drive signals corresponding to said at least one engraved pattern, said plurality of drive signals being generated in response to image data and said circumferential offset which are input into said generator.

64. The engraver as recited in claim 59 wherein said carriage further comprises a first sub-carriage and a second sub-carriage which are movable on said carriage.

65. The engraver as recited in claim 59 wherein said controller comprises:

an image memory for storing image data associated with an image to be engraved on a workpiece;

at least one buffer controller coupled to said plurality of engraving device drivers, respectively, a controller coupled to said at least one buffer controller for selectively energizing said at least one buffer controller to sequence image data transmitted from said at least one buffer controller to said plurality of engraving devices.

66. The engraver as recited in claim 65 wherein said controller comprises an encoder associated with a workpiece drive motor in said engraver.

67. An engraver comprising:

an engraving bed comprising a headstock and a tailstock mounted thereon; said headstock and tailstock being capable of rotatably supporting a cylinder therebetween;

a carriage slidably mounted on said engraving bed;

a first engraving head mounted on said carriage;

a second engraving head mounted on said carriage, said first and second engraving heads having a circumferential offset therebetween;

a controller coupled to said first and second engraving heads for energizing each of said first and second engraving heads to engrave at least one pattern on said cylinder wherein said at least one pattern comprises tracks of engraved areas which were engraved by said first and second engraving heads;

wherein said circumferential offset is at least 18 degrees.

68. An engraver comprising:

an engraving bed comprising a headstock and a tailstock mounted thereon; said headstock and tailstock being capable of rotatably supporting a cylinder therebetween;

a carriage slidably mounted on said engraving bed;

a first engraving head mounted on said carriage;

a second engraving head mounted on said carriage, said first and second engraving heads having a circumferential offset therebetween;

a controller coupled to said first and second engraving heads for energizing each of said first and second engraving heads to engrave at least one pattern on said cylinder wherein said at least one pattern comprises tracks of engraved areas which were engraved by said first and second engraving heads;

wherein said engraving head comprises:

a magnetorestrictive member coupled to a stylus.

69. The engraver as recited in claim 68 wherein the magnetorestrictive member comprises $Tb_xDy_{1-x}Fe2$.

* * * * *